United States Patent Office 3,547,784
Patented Dec. 15, 1970

3,547,784
PROCESS FOR METALLIZING FORMED OBJECTS MADE FROM THERMOPLASTICS
Günther Bernhardt, Hangelar, Robert Büning and Egon Bierwirth, Oberlar, and Werner Trautvetter, Spich, Germany, assignors to Dynamit Nobel Aktiengesellschaft, a corporation
No Drawing. Filed June 5, 1968, Ser. No. 734,565
Claims priority, application Germany, July 25, 1967, D 53,679
Int. Cl. C23b 5/60
U.S. Cl. 204—20          7 Claims

ABSTRACT OF THE DISCLOSURE

Process of metallizing copolymers of vinyl chloride with vinyl esters, vinyl ethers, itaconate esters, acrylic esters, metacrylic esters, allyl esters, and allyl ethers.

---

It is known to produce various thermoplastic articles and then to provide a metal coating thereon. For example, ABS polymers, that is acrylonitrile-butadiene-styrene copolymers and copolymer mixtures, can be metallized by applying a thin copper or nickel coating onto the surface of shaped articles made therefrom. These coated articles are then metallized by electrochemical, galvanic means: cb. K. Stöckhart, "Kunststoffe," vol. 55, p. 857 (1965) and H. Wiegand and collaborators, "Kunststoffe," vol. 56, p. 773 (1966).

It is also known that substantially any thermoplastic or thermosetting polymer article which is inherently conductive can be electroplated with a suitable metal coating. In this regard it is known to load the thermoplastic article with conductivity improving materials such as graphite: cf. R. Uebigau, "Kunststoffe," vol. 49, p. 45 (1959). This process, however, has the disadvantage that the addition of graphite or of other electrically conductive substances usually weakens the mechanical strength of the plastic.

Vinyl chloride polymers do not generally have sufficient inherent conductivity to permit metallization thereof without the inclusion thereinto of conductivity-improving substances. As noted above, such inclusion is detrimental to the physical properties of the polymer and shaped articles made therefrom.

It is an object of this invention to produce a special vinyl chloride polymer suited to use as a metallization base.

It is another object of this invention to provide shaped articles from said polymer.

It is a further object of this invention to provide a metallized vinyl chloride polymer shaped article.

Other and additional objects of this invention will become apparent from a consideration of this entire specification, including the claims hereof.

In accord with and fulfilling these objects, one aspect of this invention resides in the provision of a copolymer of vinyl chloride with an ethylenically unsaturated ester or mixtures thereof, in particular those polymerizable monomers having relatively long-chain alkyl groups attached to the ethylenically unsaturated moiety. Though the ester or ether linkage are preferred, more specifically these alkyl groups should contain 7 to 20 carbon atoms. The comonomer should be present in a proportion of about 4 to 30 weight percent, preferably 8 to 20 weight percent.

It has been found that shaped articles made from these copolymers are especially well-adapted to have a metal coating placed thereon without the detrimental necessity of incorporating graphite or the like therein.

The alkyl radicals referred to above are preferably straight chain; however, branch chain alkyl radicals are also within the scope of this invention. In this regard, the alkyl radicals may be cetyl, octyl, decyl, dodecyl, hexadecyl, octadecyl, etc.

The vinyl chloride copolymers of this invention are suitably produced by standard vinyl chloride homo- and copolymerization techniques. These copolymers are formed into shaped articles by usual thermoplastic techniques, such as extrusion, injection molding, compression molding, casting, etc. After formation of the shaped article, such as suitably metallized by the formation thereon of a thin silver or copper coating by dipping the article in a silver or copper-salt bath and reducing the silver or copper salt. The thus coated article is then electroplated.

This invention is particularly adapted to use copolymers which have been prepared at low temperatures and have a tactial arrangement of the chloride atoms therein. The metallization of such copolymers results in metallized form bodies, wherein the metal film adheres quite strongly to the copolymer body. Copolymers having a tactical arrangement of the chlorine atoms have higher softening points than those having an atactic arrangement of chlorine atoms. It is surprising that copolymers having such a tactical arrangement can be metallized just as well as such copolymers having an atactical arrangements of such chlorine atoms, despite of the fact that the chemical reactivity of such tactical polymers is lower than that of corresponding atactic polymers.

Copolymer material within the scope of this invention has been made into sheet form 4 mm. thick, using a barium-cadmium stabilizer. After stabilization, the sheet was prepared for metallization by the following treatment:

(1) Degreasing with 40% caustic soda solution.
(2) Etching with chromosulfuric acid (40 g. $K_2Cr_2O_7$) plus 20 g. of water plus 500 cc. concentrated sulfuric acid at 60° C. for 60 minutes.
(3) Neutralization with 20% aqueous $NaHSO_3$.
(4) Sensitization with stannous chloride solution (35 g. $SnCl_2$ plus 50 cc. concentrated HCl plus 1000 cc. of water).
(5) Activation with silver nitrate solution (dissolve 2 g. $AgNO_3$ in water, add 10 cc. ammonia (conc.) and add water to make 1 liter).

The thus prepared sheeting was then treated to provide a thin metal coating thereon. This was performed, for example, by combining the following solutions in a 1:1 ratio and then dipping the plastic into it.

Solution A:
    31.8 g. copper sulfate
    8.2 g. nickel chloride
    76.6 g. 37% aqueous formaldehyde solution
    532 cc. water
Solution B:
    23.0 g. NaOH
    95.5 g. potassium sodium tartrate
    8.2 g. $Na_2CO_3$
    532 cc. water.

The copper electroplating is performed, for example, in an acid copper sulfate bath of 250 g. $CuSO_4$, 100 g. sulfuric acid and 1000 cc. water at a voltage of 0.5 volt. The metal layer was built up to 70 microns on the plastic material prepared in known manner.

Strength of adherence: 4.2 kg./25 mm. per DIN 40802.

Other metals, such as Ag, Au, Ni, Cr or the like can be electroplated onto the ground coating of copper and/or nickel and/or silver, in a similar manner.

The chemical production of a nickel-ground coat can be accomplished as follows: Immerse plastic at 90° C., in the following solution:

30 g. nickel chloride
10 g. sodium hypophosphate
100 g. sodium citrate and
50 g. ammonium chloride,
plus water to make 1000 cc.
adjusted with ammonia to pH 8-10.

The chemical production of a silver ground coat is performed, for example, in a prior-art manner, by immersing the object in a silver salt solution to which a reducing agent has been added. The adherence strengths of said metal to said copolymer film were determined by DIN Standard 40802.

The following table shows the various copolymers produced and ethylized according to this invention, which have been metallized according to the procedure set forth above with a copper metallized top layer.

| Vinyl chloride, wt. percent | Comonomer, wt. percent | Strength of adherence, kg./25 mm. |
|---|---|---|
| 85 | 15% Versatic acid vinyl ester 911 (commercial name used by Shell). | 3.1-4.9 |
| 92 | 8% cetyl vinyl ether | 3.5-4.0 |
| 92 | 8% lauryl vinyl ether | 3.2-4.0 |
| 92 | 8% 1-methyl-2-cetylitaconic ester | 2.5-3.2 |
| 92 | 8% 1-methyl-2-cetylitaconic ester (prepared at −20° C.). | 2.6-3.3 |
| 88 | 12% 1,2-dicetylitaconic ester | 4.0-4.8 |
| 92 | 8% acrylic acid isooctyl ester | 3.9-4.2 |
| 92 | 8% acrylic acid isooctyl ester (prepared at −20° C.). | 4.0-4.3 |
| 92 | 8% acrylic acid cetyl ester | 4.1-4.6 |
| 92 | 8% acrylic acid cetyl ester (prepared at −20° C.). | 4.0-4.5 |
| 92 | 8% methacrylic acid dodecyl ester | 3.9-4.3 |
| 92 | 8% stearic acid allyl ester | 4.1-4.6 |
| 92 | 8% lauric acid allyl ester | 3.8-4.2 |

What is claimed is:

1. A metallized thermoplastic shaped article, having as its thermoplastic polymer base a copolymer of vinyl chloride with at least one ethylenic unsaturated member selected from the group consisting of vinyl esters, allyl esters, and allyl ethers.

2. The article claimed in claim 1, wherein said comonomer has long-chain alkyl groups attached to said ethylenic unsaturated salt through ester or ether linkage.

3. The article claimed in claim 2, wherein said alkyl group has about 7 to 20 carbon atoms.

4. An article as claimed in claim 1, wherein said comonomer is present in a proportion of about 4 to 30 weight percent.

5. An article as claimed in claim 1, wherein said comonomer is present in a proportion of about 8 to 20 weight percent.

6. An article as claimed in claim 1, wherein said comonomer is at least one member selected from the group consisting of vinyl acetate, cetyl vinyl ether, lauryl vinyl ether, 1-methyl-2-cetylitaconic ester, 1,2-dicetylitaconic ester, acrylic acid isooctyl ester, acrylic acid cetyl ester, methacrylic acid dodecyl ester, stearic acid allyl ester and lauric acid allyl ester.

7. Process of producing an article as claimed in claim 1, comprising forming a copolymer of vinyl chloride and about 4 to 30 weight percent of at least one comonomer selected from the group consisting of vinyl esters, vinyl ethers, itaconate esters, acrylic esters, metacrylic esters, allyl esters, and allyl ethers, forming a shaped article of such copolymer, dipping said shaped article into a solution of salt of at least one member selected from the group consisting of copper, nickel, and silver, which solution contains a reducing agent, whereby forming a thin coating of said metal thereon and then electroplating a metal thereonto.

References Cited

UNITED STATES PATENTS 3,416,992 12/1968 Amos _____ 204—30
3,466,232 9/1969 Francis _____ 204—20

OTHER REFERENCES

Plating on Plastics, C. C. Weekly Plating, January 1966, pp. 107–109.

JOHN H. MACK, Primary Examiner

T. TUFARIELLO, Assistant Examiner

U.S. Cl. X.R.

117—47; 204—20, 30